2,910,484
POLYHYDRIC-ALDEHYDE CONDENSATION PRODUCTS

George de Stevens, New Providence, Hans Heymann, Chester, and Rudolph Leopold Mayer, Summit, N.J., assignors to Ciba Pharmaceutical Products, Inc., Summit, N.J., a corporation of New Jersey No Drawing. Application May 9, 1957
Serial No. 658,005

14 Claims. (Cl. 260—340.3)

This invention relates to certain polymeric condensation products and the preparation of such products. More particularly, it relates to polymers prepared by polycondensation of phenolic acids with aldehydes of the respective formulae:

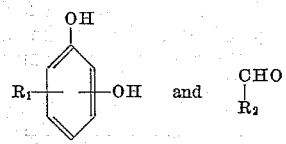

in which $R_1$ stands for a carboxylic or sulfonic acid group and $R_2$ represents an aromatic or heterocyclic radical, and metal salts thereof.

Metal salts of the polymers of this invention are those formed with the carboxylic acid or sulfonic acid groups, more especially those with alkaline or alkaline earth metals, e.g. sodium, potassium or calcium.

An aromatic radical is more especially a monocarbocyclic radical, which may be unsubstituted or substituted, for example, by halogen atoms e.g. chlorine or bromine; lower alkoxy groups, e.g. methoxy or ethoxy groups; amino groups e.g. amino or dimethylamino groups; nitro groups; hydroxyl groups; carboxylic or sulfonic acid groups; or lower alkyl groups e.g. methyl or ethyl groups.

A heterocyclic radical is more especially a monocyclic radical containing one hetero atom e.g. oxygen, nitrogen or sulfur, as a ring member. Such heterocyclic radicals are, for example, unsubstituted or substituted furano, pyrrolo, thiopheno or pyridino radicals. Substituents of such radicals are, for example, lower alkyl groups, e.g. methyl; halogeno atoms, e.g. chlorine or bromine; amino groups e.g. amino; or nitro groups.

The new polycondensation products of this invention have anticoagulant properties and may be used as laboratory tools in testing procedures where blood coagulation must be avoided or as medicinal agents. Especially valuable as anticoagulant agents are those polymers in which $R_2$ is a furano radical, particularly the 5-nitro-furano radical.

In addition to the anticoagulant effects it has been found that the new polymeric substances of this invention have an influence on the growth of bacteriophages, chance contaminants frequently noted in the production of molds, which may inhibit the growth of microorganisms; as an example, the Streptomyces phage hinders the propagation of Streptomyces molds and thus prevents the production of streptomycin. The new polymers may therefore be used in the production of antibiotics to check the multiplication of the parasitic bacteriophages.

The new polymers of this invention may be prepared by treating a mixture of an aromatic acid of the formula:

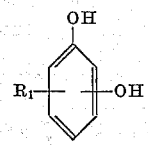

or a salt thereof, and an aromatic or heterocyclic aldehyde of the formula:

$$R_2\text{---CHO}$$

or a functional derivative thereof, in which formulae $R_1$ and $R_2$ have the meaning given above, with a polymerizing agent such as an aqueous solution of an inorganic acid or an inorganic base.

Salts of a dihydroxy-benzene carboxylic or sulfonic acid are more especially those with alkaline or alkaline earth metals, e.g. sodium, potassium or calcium.

Functional derivatives of aldehydes are those which can readily be converted into the aldehydes, such as the derivatives formed with alcohols, i.e. the acetals, such as the dimethoxy or diethoxy derivatives; or those formed with aliphatic carboxylic acids or derivatives such as anhydrides thereof, i.e. the diacyloxy, such as diacetoxy, derivatives.

The polymerization is effected by treatment with an aqueous solution of a strong inorganic base, e.g. sodium or potassium hydroxide; or of a strong inorganic acid, e.g. sulfuric acid. Preferably the mixture of the aromatic acid and the aldehyde in the aqueous solution of the base of the acid is refluxed for several hours, and the resulting polymer is purified by washing with water or especially by dialysis against water for several days.

The starting materials used in the polymerization reaction are known or may be prepared according to procedures known for the preparation of analogous compounds.

Depending on the conditions the compounds of this invention may be obtained in the form of free acids or as salts. Salts, such as sodium salts, are converted into free acids by acid treatment, e.g. with hydrogen chloride. The metal salts of the polymeric substances, such as those with alkali metals, may be formed, for example, by treating a solution of the polymer in aqueous alkali metal hydroxide, e.g. sodium hydroxide, with about 5–15 times the volume of ethanol and 5–10 times the volume of acetone, whereupon the alkali metal, e.g. sodium salt, precipitates.

The following examples are intended to illustrate the invention. They are not to be construed as limitations thereon. Temperatures are given in degrees centigrade.

Example 1

A mixture of 7.7 g. of 3,4-dihydroxy-benzoic acid and 5.3 g. of benzaldehyde in 50 ml. of 50% aqueous sulfuric acid is refluxed while stirring for 5 hours. The resulting dark brown residue is collected by filtration, washed with water and dissolved in 100 ml. of a 5% aqueous solution of sodium hydroxide. This solution is dialyzed for 3 days against distilled water using a cellophane membrane and then acidified with 10% aqueous hydrochloric acid to pH 2. The amorphous dark precipitate is collected by centrifugation, washed with water and dried at about 100° under reduced pressure, yield: 0.85 g. of polymeric substance.

Example 2

To a solution of 7.7 g. of 2,5-dihydroxy-benzoic acid in 100 ml. of a 5% aqueous solution of sodium hydroxide is added 4.4 g. of furfural and the mixture is refluxed for 6 hours while stirring vigorously. After chilling, the alkaline solution is dialyzed for 2 days against distilled water using a cellophane membrane and then acidified with a 10% aqueous solution of hydrochloric acid. The black precipitate is filtered off, washed with water and dried over sulfuric acid under reduced pressure, yield 1.60 g.

Instead of acidifying the alkaline solution, a mixture of 500 ml. of ethanol and 100 ml. of acetone may be added to the latter, whereupon the sodium salt of the polymeric substance precipitates.

Example 3

A mixture of 7.7 g. of 2,5-dihydroxy-benzoic acid and 5.2 g. of pyridine-4-aldehyde in 200 ml. of a 3% aqueous solution of sodium hydroxide is treated as described in Example 2. Without dialyzing the alkaline solution is acidified with 10% aqueous hydrochloric acid to pH 2 and the resulting dark precipitate is purified by repeated washes with water; yield 0.26 g.

Example 4

A mixture of 9.5 g. of 2,5-dihydroxy-benzene sulfonic acid and 5.2 g. of pyridine-3-aldehyde in 100 ml. of a 5% aqueous solution of sodium hydroxide is refluxed for 8 hours while vigorously stirring. The pH value of the chilled solution is adjusted to 7 and after dialysis against distilled water for 7 hours, the dialysis residue is evaporated to dryness. The remaining viscous material is washed with ether, then with a mixture of ether and dioxane and is finally triturated with ethanol. The brown residue is collected, washed with ethanol and dried over sulfuric acid, yielding 6.12 g. of the polymeric substance.

Example 5

A mixture of 9.5 g. of 2,5-dihydroxy-benzene sulfonic acid and 4.4 g. of furfural in 100 ml. of a 5% aqueous solution of sodium hydroxide is treated according to the process given in Example 4 yielding 5.0 g. of polymeric substance.

Example 6

7.7 g. of 3,4-dihydroxy-benzoic acid, when treated with 4.4 g. of furfural according to the method given in Example 2, yields 2.15 g. of polymeric substance.

Example 7

A mixture of 7.7 g. of 3,5-dihydroxy-benzoic acid and 5.35 g. of pyridine-4-aldehyde is treated as described in Example 4 and yields 1.26 g. of a light brown polymeric compound.

Example 8

The mixture of 7.7 g. of 2,5-dihydroxy-benzoic acid, 5.3 g. of benzaldehyde and 50 ml. of 50% aqueous sulfuric acid is treated as described in Example 1 and 1.2 g. of a polymeric substance is recovered.

Example 9

A mixture of 7.7 g. of 3,5-dihydroxy-benzoic acid and 5.3 g. of benzaldehyde in 50 ml. of 50% sulfuric acid is treated as described in Example 1 and 6.2 g. of a polymeric substance is obatined.

Example 10

A mixture of 7.7 g. of 2,5-dihydroxy-benzoic acid and 13.9 g. of 5-nitrofurfural diacetate in 200 ml. of a 5% aqueous solution of sodium hydroxide is treated as described in Example 2, yield: 1.8 g. of a polymeric substance.

Example 11

A solution of 9.5 g. of 2,5-dihydroxy-benzoic acid and 13.9 g. of 5-nitro-furfural diacetate in 200 ml. of a 5% aqueous sodium hydroxide solution is refluxed for 5 hours and the reaction mixture worked up as outlined in Example 2, yielding 10.0 g. of polymeric substance.

Example 12

A mixture of 5.0 g. of 2,3-dihydroxy-benzoic acid and 8.0 g. of 5-nitro-furfural acetate in 100 ml. of a 5% aqueous sodium hydroxide solution is reacted as described in Example 2, yield: 0.78 g. of polymeric material.

Example 13

A mixture of 7.7 g. of 2,5-dihydroxy-benzoic acid and 8.8 g. of 3,4-dichloro-benzaldehyde in 100 ml. of a 5% aqueous sodium hydroxide solution is reacted as described in Example 2, yield 0.15 g. of a polymeric substance.

Example 14

A mixture of 7.5 g. of 4-dimethylamino-benzaldehyde and 7.7 g. of 2,5-dihydroxy-benzoic acid is reacted according to the procedure of Example 1, yield 0.4 g. of polymer.

Example 15

A mixture of 7.7 g. of 2,5-dihydroxy-benzoic acid, 12.0 g. of the sodium salt of 4-methoxy-benzaldehyde-3-sulfonic acid and 100 ml. of a 50% aqueous sulfuric acid is reacted according to the method outlined in Example 1, yield 2.6 g. of a polymeric substance.

Example 16

A mixture of 15.4 g. of 3,5-dihydroxy-benzoic acid and thiophene-2-aldehyde in 100 ml. of a 50% aqueous sulfuric acid is reacted according to the process given in Example 1, yield 0.3 g. of polymeric material.

Example 17

7.7 g. of 2,3-dihydroxy-benzoic acid, when reacted with 5.6 g. of thiophene-2-aldehyde in 100 ml. of a 5% aqueous solution of sodium hydroxide according to Example 2, yields 0.1 g. of a polymeric substance.

Example 18

A mixture of 15.4 g. of 3,5-dihydroxy-benzoic acid, 24.4 g. of 5-nitro-furfural diacetate and 200 ml. of a 5% aqueous solution of sodium hydroxide yields, when reacted according to the method of Example 2, 6.1 g. of a polymeric substance.

Example 19

To a solution of 15.4 g. of 2,5-dihydroxy-benzoic acid in 200 ml. of a 5% aqueous solution of sodium hydroxide is added 11.2 g. of thiophene-2-aldehyde and the mixture reacted according to Example 2, yield 0.12 g. of a polymer.

Example 20

A mixture of 7.7 g. of 2,5-dihydroxy-benzoic acid and 7.6 g. of 4-nitro-benzaldehyde in 100 ml. of a 5% aqueous solution of sodium hydroxide is treated according to Example 2, yield 1.92 g. of a polymeric substance.

What is claimed is:

1. A member of the group consisting of polymeric condensation products prepared by polycondensation in the presence of an aqueous solution of a member of the group consisting of a strong inorganic acid and a strong, inorganic base of phenolic acids with aldehydes of the respective formulae:

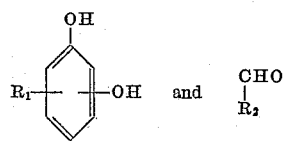

in which $R_1$ stands for a member of the group consisting of a —COOH and an —SO$_3$H group, and $R_2$ represents a member of the group consisting of an aromatic monocarbocyclic and a heterocyclic monocyclic radical having one hetero atom, alkali metal, and alkaline earth metal salts thereof.

2. Polymeric condensation products, prepared by polycondensation in the presence of an aqueous solution of a member of the group consisting of a strong inorganic acid and a strong, inorganic base of phenolic carboxylic acids with an aldehyde of the respective formulae:

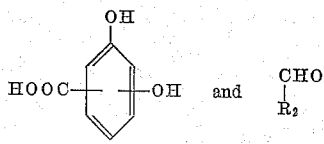

wherein $R_2$ represents a heterocyclic monocyclic radical having one hetero atom.

3. Polymeric condensation products, prepared by polycondensation in the presence of an aqueous solution of a member of the group consisting of a strong inorganic acid and a strong, inorganic base of phenolic carboxylic acids with a furfural of the respective formulae:

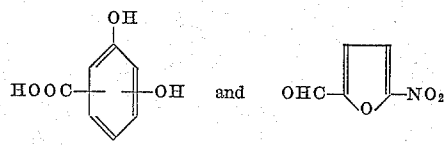

4. The polymer prepared by polycondensation in the presence of an aqueous solution of a member of the group consisting of a strong inorganic acid and a strong, inorganic base of 2,5-dihydroxybenzoic acid with 5-nitrofurfural diacetate.

5. The polymer prepared by polycondensation in the presence of an aqueous solution of a member of the group consisting of a strong inorganic acid and a strong, inorganic base of 2,3-dihydroxybenzoic acid with 5-nitrofurfural diacetate.

6. The polymer prepared by polycondensation in the presence of an aqueous solution of a member of the group consisting of a strong inorganic acid and a strong, inorganic base of 3,5-dihydroxybenzoic acid with 5-nitrofurfural diacetate.

7. In a process for the preparation of a member of the group consisting of polymeric condensation products and salts thereof the step which comprises treating a mixture of an aromatic acid and an aldehyde of the respective formulae:

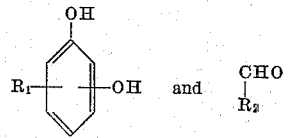

in which formulae $R_1$ stands for a member of the group consisting of a —COOH and an —SO$_3$H group, and $R_2$ represents a member of the group consisting of an aromatic monocarbocyclic and a heterocyclic monocyclic radical having one hetero atom, with the aqueous solution of a member of the group consisting of a strong, inorganic acid and a strong, inorganic base.

8. Process according to claim 7 wherein a phenolic carboxylic acid and an aldehyde of the respective formulae:

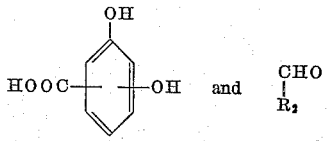

in which $R_2$ represents a heterocyclic monocyclic radical having one hetero atom, are used as the starting materials.

9. Process according to claim 7 wherein 5-nitro-furfural diacetate is used as the starting material.

10. Process according to claim 7 wherein an aqueous solution of an alkali metal hydroxide is used.

11. Process according to claim 10 wherein an aqueous solution of sodium hydroxide is used.

12. Process according to claim 7 wherein an aqueous solution of sulfuric acid is used.

13. Process according to claim 7 wherein the polymerization is effected by refluxing the mixture.

14. Process according to claim 7 wherein the resulting polymer is purified by dialysis against water.

References Cited in the file of this patent

UNITED STATES PATENTS 2,477,641   Nagel _____ Aug. 2, 1949

OTHER REFERENCES

Madsen: Arch. Pharm., vol. 245, pp. 42–48 (1907), abstracted in Chem. Abstr., vol. 1, 1702$^8$ (1907).